March 13, 1945.  M. A. SWAN  2,371,196
REAR VIEW REFLECTOR FOR ATTACHMENT TO EYE GLASSES
Filed Nov. 9, 1942
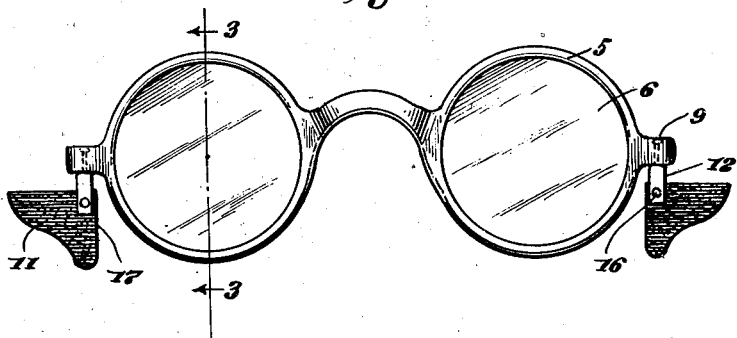
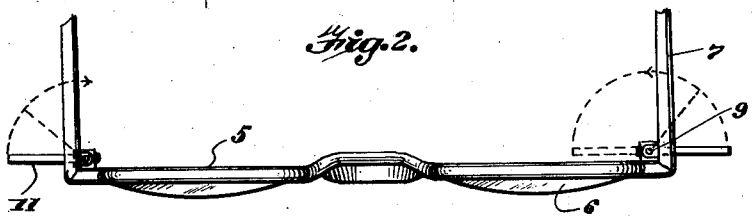
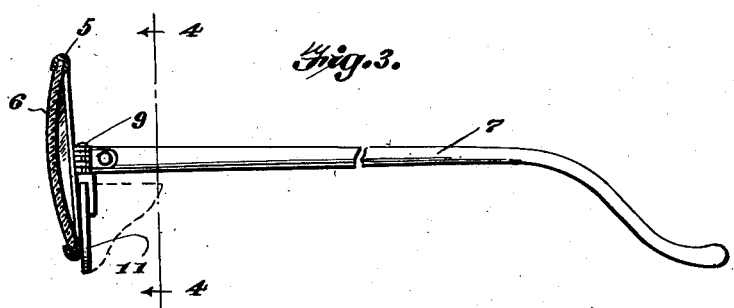
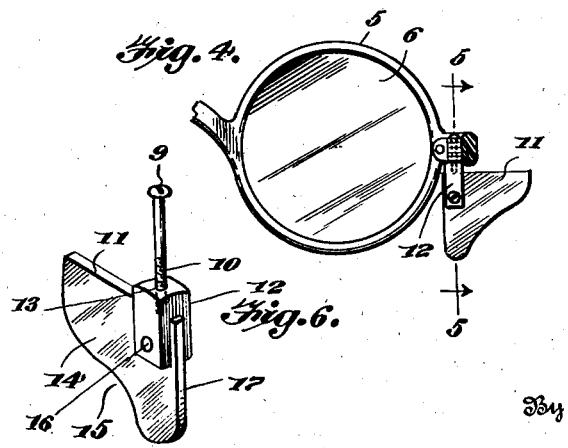
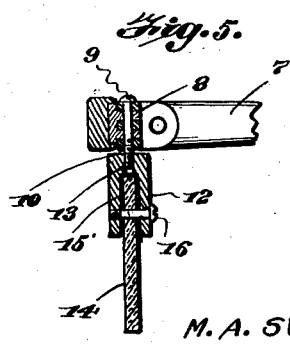
Inventor
M. A. SWAN
By Lacey & Lacey,
Attorneys Patented Mar. 13, 1945

2,371,196

UNITED STATES PATENT OFFICE 2,371,196

REARVIEW REFLECTOR FOR ATTACHMENT TO EYEGLASSES

Moranus A. Swan, Los Angeles, Calif.

Application November 9, 1942, Serial No. 465,026

8 Claims. (Cl. 88—41)

This invention relates to eye glasses and more particularly to a rear view reflector for use in connection therewith.

The object of the invention is to provide a mirror or reflector of simple and inexpensive construction capable of being readily attached to a pair of eye glasses and by means of which the user may observe traffic or objects at the rear of a vehicle when driving an automobile or other conveyance.

A further object of the invention is to mount the reflector on the eye glasses in such a manner as to permit adjustment thereof to various angular positions so as to reflect different objects in the rear of the path of travel of the vehicle and bring said objects within the line of vision of the user.

A further object is to provide a pair of rear view reflectors mounted on and depending from the pivot pins of the side bows or temples of the eye glasses so as to turn relative thereto, with said pins as an axis.

A still further object of the invention is generally to improve this class of devices so as to increase their utility, durability and efficiency, as well as to reduce the cost of manufacture.

In the accompanying drawing:

Figure 1 is a front elevation of a pair of eye glasses provided with rear view reflectors embodying the present invention.

Figure 2 is a top plan view.

Figure 3 is a vertical sectional view taken on the line 3—3 of Figure 1.

Figure 4 is a vertical sectional view taken on the line 4—4 of Figure 3.

Figure 5 is an enlarged vertical sectional view taken on the line 5—5 of Figure 4.

Figure 6 is a perspective view of one of the reflectors detached.

The improved rear view reflector forming the subject matter of the present invention may be used in connection with any type of eye glasses and, by way of illustration, is shown in connection with a pair of spectacles in which the numeral 5 designates the frame, 6 the lenses, and 7 the side bows or temples pivotally connected with the frame by means of hinge joints 8 including pivot pins or screws indicated at 9. The pivot pins or screws 9 are preferably made longer than the thickness of the temples 7 so as to provide depending threaded portions 10 which serve to receive and support the reflectors 11.

Each reflector 11 comprises an inverted substantially U-shaped holder 12 formed of metal or other suitable material and having its upper end closed and provided with a threaded opening 13 adapted to receive the lower correspondingly threaded end 10 of the adjacent pivot pin 9 so that said holder is free to turn on the frame of the eye glasses with the pin 9 as an axis.

Fitted in the lower open end of the holder is a mirror 14, preferably triangular in shape and having one edge thereof fashioned in the form of an ogee curve, as indicated at 15. A suitable backing or cushion 15' is preferably seated within the opening in the holder to assist in preventing breakage of the mirror 14 and extending transversely through said holder and adjacent portion of the mirror is an anchoring screw 16 which serves to clamp the parts firmly together.

One of the reflectors 11 is preferably disposed at each side of the eye glasses with the reflecting surfaces of the mirrors facing the lenses 6, so that by adjusting said reflectors laterally, the user may observe traffic or other objects in the rear of the path of travel when driving an automobile or other conveyance. The reflectors are free to move laterally with respect to the lenses 6 and, by tightening the pivot pins 9, sufficient pressure may be exerted on the holders to secure them in a selected position of adjustment without binding or wedging action between the parts. Furthermore, as the reflectors are free to swing laterally on the pivot pins 9, they may be folded inwardly against the lenses 6, as indicated in dotted lines in Figure 2, when the eye glasses are not in use so as to occupy very little space and permit the eye glasses to be carried in a conventional case or container.

It will furthermore be noted that the inner vertical edge 17 of each reflector is disposed in vertical alinement with the holder 12 and spaced from the eye glass frame so as to permit free turning movement of the reflectors without interfering with the frame.

It will thus been seen that there is provided a simple and durable rear view reflector which may be attached to any type of eye glasses, which is dependable in use and efficient in action, and which can be manufactured and marketed at a reasonable cost.

It will, of course, be understood that the devices may be made in different sizes and shapes and constructed of any suitable material without departing from the spirit of the invention.

Having thus described the invention, what is claimed is:

1. The combination with a pair of eye glasses including temples provided with pivot pins having depending threaded extensions, of a reflector disposed on each side of the eye glasses and comprising an inverted substantially U-shaped holder having an opening in the upper portion thereof for engagement with the threaded extension of the adjacent pivot pin, a mirror fitted in each holder, and fastening devices extending through said holders and mirrors.

2. The combination with a pair of eye glasses including temples provided with pivot pins having threaded extensions, of a rear view reflector mounted at each side of said eye glasses and each comprising an inverted substantially U-shaped holder having a threaded opening therein for engagement with the threaded end of the adjacent pivot pin, a cushioning member fitted within the open end of the holder, a mirror bearing against the cushioning member, and a fastening device extending through the cushioning member, holder and mirror.

3. The combination with a pair of eye glasses including a temple provided with a pivot pin having a depending threaded extension, of a reflector including a holder fitted on the threaded extension of the pivot pin, a substantially triangular shaped mirror carried by the holder and having one edge thereof in the form of an ogee curve and another edge disposed in vertical alinement with the holder, said mirror and holder being movable as a unit to different positions of angular adjustment with respect to the eye glasses with the pivot pin as an axis.

4. A rear view reflector for attachment to a pair of eye glasses comprising a substantially inverted U-shaped holder having its upper end provided with a threaded opening adapted to receive the pivot pin of a temple of the eye glasses, a substantially triangular shaped mirror fitted in the holder, and a fastening device extending through the holder and said mirror.

5. The combination with a pair of eye glasses including temples and hinge joints for the temples provided with pivot pins having threaded lower end portions, of a rear view reflector threaded upon the lower end portion of each pin as a fastener, said reflectors depending from the hinge joints and free to turn relative to the glasses with the pivot pins as axes.

6. The combination with a pair of eye glasses including a frame and temples and hinge joints between the frame and temples each provided with a pivot pin having a head at its upper end and a threaded lower end portion, the threaded end of each pin extending downwardly from the joint, of a reflector comprising a holder provided with a threaded opening receiving the depending threaded portion of the pin and constituting a fastener for the pin, and a mirror carried by the holder, said holder and mirror being free to turn with the pivot pin as an axis.

7. The combination with a pair of eye glasses having lenses and including temples and hinge joints for the temples provided with pivot pins having threaded portions depending from the joints, of a rear view reflector disposed at each side of the eye glasses and each comprising a holder formed with a threaded opening receiving the depending threaded portion of the adjacent pivot pin, the holders being each provided with depending arms, and reflectors mounted between the depending arms of said holders, said reflectors being movable to different positions of angular adjustment with respect to the eye glasses with the pivot pins as an axis, said reflectors being disposed flat against the rear faces of the lenses of the eye glasses when folded inwardly to inoperative position.

8. The combination with a pair of eye glasses including a temple and a hinge joint for the temple provided with a pivot pin having a threaded end portion extending from the joint, of a reflector comprising a holder formed with a threaded socket receiving the threaded end portion of the pivot pin as an axis, and a mirror carried by the holder, the pin when turned in a tightening direction drawing the holder towards the hinge joint and into engagement therewith to frictionally hold the reflector in a set position of adjustment.

MORANUS A. SWAN.